Patented Aug. 8, 1939

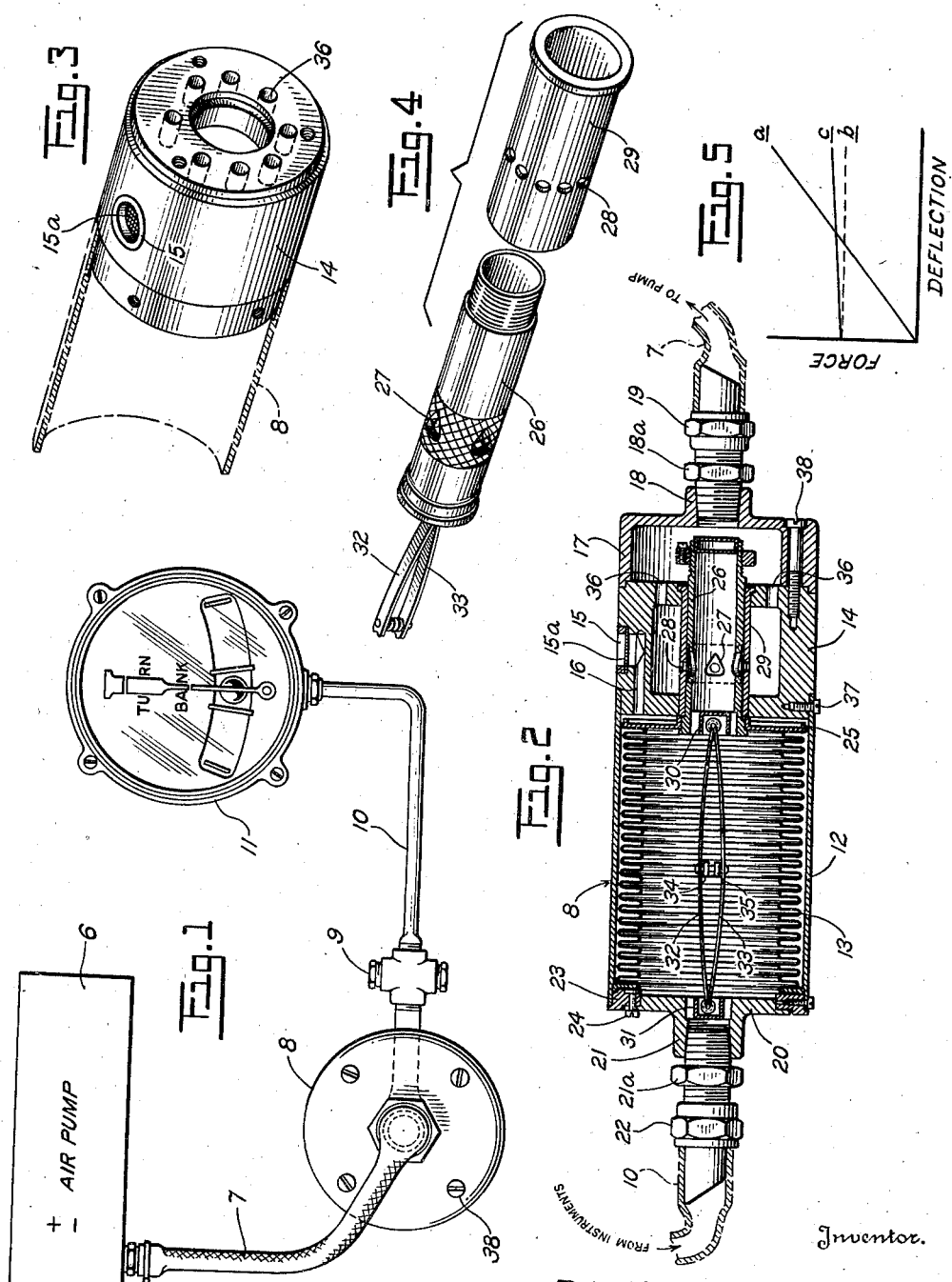

2,168,536

UNITED STATES PATENT OFFICE 2,168,536

PRESSURE REGULATING DEVICE FOR AIRCRAFT INSTRUMENTS

Dimitry E. Olshevsky, East Orange, N. J., assignor to Bendix Aviation Corporation, South Bend, Ind., a corporation of Delaware Application January 21, 1937, Serial No. 121,711

10 Claims. (Cl. 137—153)

The present invention relates to pressure regulating devices for supplying fluids at constant pressure or at a constant pressure difference and more particularly to pressure regulating devices adapted to control the air supply from a suitable source to air-operated gyroscopic instruments on an aircraft to supercharged cabins or superchargers thereof and to serve generally as airship relief valves.

At the present time, several air-operated gyroscopic instruments are employed such, for example, as a gyroscopic turn indicator, directional gyroscope and a gyro pendulum which provides an artificial horizon. In order that such instruments be capable of efficient operation it is desirable that the speed of rotation of the gyro rotors thereof be maintained substantially constant or in other words that the pressure difference between the outside and the interior of the case of the instrument be maintained constant, assuming air of a constant density. Air pressure for driving the gyro rotors is generally supplied either from the aircraft engine by operating a pressure or suction pump, or by using the suction produced by the intake manifold of the engine or by a Venturi tube projecting from the wing of the aircraft. In all of these instances, however, the driving air pressure varies with the speed of the engine or of the craft and consequently the speed of rotation of the gyro rotors of the instruments varies accordingly.

In the present invention, it is proposed to interpose between the pressure supply and the indicators, a regulating valve for maintaining the pressure drop in the instrument substantially constant. In this specification the term "pressure" is used in the broad sense to include either super-atmospheric pressure or sub-atmospheric pressure generally designated as a suction, the latter being the most usually employed at present.

It is, therefore, one of the objects of the present invention to provide novel pressure regulating means for supplying air at a constant pressure difference or constant driving pressure to gyroscopic instruments on an aircraft whereby the gyro rotors of said instruments are maintained at a constant speed.

Pressure regulating devices for maintaining a constant driving pressure or suction are broadly old per se and generally comprise a differential valve which is opened or closed against, or by means of, a coil spring or transversely loaded leaf spring. It has been found, however, that when such springs are used the compression of the springs and, hence, the movement of the movable member of the valve is directly proportional to the pressure or suction applied thereto at all values thereof. It is desirable, however, that the valve operate in such a manner that no movement of the movable member of the valve takes place until the pressure or suction has reached a predetermined or threshold value and that thereafter very little or no additional pressure or suction be required to further move the movable member of the valve.

The use of leaf springs as collapsing columns in a pressure regulating device is also broadly old per se. Such a spring, however, has been used solely to replace the former coil springs and not in the novel manner of the present invention.

In the present invention, a leaf spring is used and is made to act as a collapsible column that is, it is stressed by forces acting along the line connecting both ends of the spring. Other features are introduced which will be further explained below.

Accordingly, another object of the invention is to provide in a differential valve, novel resilient means for controlling the movable member of the valve in such a manner that no movement of said member takes place until the pressure or suction has reached a predetermined value and thereafter very little or no additional force is required to further move said movable member. This may be accomplished, for example, by using a leaf spring or several leaf springs in a new and novel manner.

Such a leaf spring is loaded longitudinally, as a column, and is given an initial set which determines the initial or threshold value of its force. Such force, however, should not be transmitted to the actuating diaphragm as otherwise the opposing force of the spring and the actuating force of the diaphragm would tend to a state of equilibrium, destroying the threshold value of resistance to be maintained by the novel spring.

Another object of the invention, therefore, is to supply in combination with a valve mechanism, a spring requiring a threshold value that must be applied before any movement of the valve is obtained.

Still another object is to provide in combination with a valve mechanism, a leaf spring initially positioned in a non-linear position by means constraining the path said spring shall follow on deflection thereof, whereby an initial or threshold resistive force is supplied.

A further object is to provide in combination with a valve mechanism, two leaf springs having their ends connected together and being spaced apart intermediate said ends so as to make said springs slightly concave in directions towards each other, and means for initially determining the concavity of said springs.

Still another object is to provide in combination with a valve mechanism, a leaf spring in a non-force producing position whereby, when said valve is moved thereagainst, an initial or threshold value of resilient opposition in said spring must be overcome.

The above and other objects and advantages of the invention will appear more fully hereinafter from a consideration of the detailed description which follows, taken together with the accompanying drawing wherein is illustrated one embodiment of the invention. It is to be expressly understood, however, that the drawing is for the purposes of illustration and description only and is not designed as a definition of the limits of the invention, reference being had for this purpose to the appended claims.

In the drawing wherein like reference characters refer to like parts throughout the several views;

Fig. 1 is a diagram showing the regulator valve between the air pump and a gyroscopic instrument;

Fig. 2 is a cross-section of the regulator valve;

Fig. 3 is a view, illustrating, the casing for the diaphragm, the air vent and ports leading to the pump line;

Fig. 4 is an exploded view showing the structure of the slide valve; and

Fig. 5 is a diagram illustrating the threshold value of the force required to operate the valve whose movement is opposed by the novel spring.

Referring to the drawing, in Fig. 1 the rectangle 6 represents diagrammatically any form of pressure or suction producing means, such as a pump, blower, intake manifold or Venturi tube. 7 is a conduit comprising pipe or tubing leading to the regulator valve 8. Valve 8 controls the flow through the shut-off valve 9 and conduit 10 to the gyroscopic device 11 here shown as a turn indicator.

As shown in Fig. 2, said regulator valve comprises a shell 12 which houses a Sylphon or bellows 13 and to which is attached at one end thereof a cylinder 14 having an air inlet 15 with a screen 15a and a duct 16, and providing a support for the sliding valve. Cap 17 closes off one end of the device and supplies a screw fitting 18 for the nipple 18a to which is connected union 19 and tubing 7 leading to the pump or other pressure producing device. The air inlet 15 may either communicate to the outside air or may be connected by means of a tubing (not shown) to a container enclosing air, gas or another fluid kept at a substantially constant pressure. The other end of the device is closed off by a cover 20 supplying screw fitting 21 for the nipple 21a to which is connected union 22 and tubing 10 leading to the instrument or instruments to be operated. Cover 20 is connected to ring 23 by screws 24.

Ring 23 supports the corrugated metal container 13 comprising the movable Sylphon or bellows for actuating the slide valve. The other end of said Sylphon is closed off by disc 25 within the center of which is fastened the slide member 26 with ports 27 cooperating with ports 28 in stationary member 29, said parts comprising the slide valve before mentioned.

Adjacent to or in contact with said sliding member 26 is guide 30 of the leaf spring device, the other guide 31 of which, contacts or is adjacent to the cover member 20. The leaf spring device comprises two leaf springs 32, 33 joined at their ends said ends being pivotally connected to guides 31 and 30. Located between said springs 32 and 33 are spacer elements 34, 35 riveted to springs 32 and 33, respectively, said elements 34 and 35 constraining springs 32 and 33 to their convex conformation even if said springs tend to assume a linear or non-force producing position. By means of said spacer elements 34 and 35 the springs are constrained to their convex positions or these elements may be so designed that their thickness determines the amount of separation of the springs or the threshold value of resistance that these springs exert, which resistance must be overcome before any movement of the sliding valve can take place. Means are, therefore, provided by which the spring device may be manufactured and assembled as a unit and its threshold value determined before insertion into the regulator proper. This threshold value once determined remains constant and thereby determines the threshold value at which the sliding valve will be moved. By using different sizes of said spacer elements or by filing these elements, spring devices varying in their threshold value can thus be obtained which are easily manufactured, whose initial threshold value can be calibrated before final assembly and which can be uniformly reproduced.

In cylindrical element 14 are located ports 36 through which air is sucked by the pump attached to conduit 7.

Element 14 is connected to shell 12 by screws 37 while cap 17 is attached to element 14 by screws 38.

In Fig. 5 is illustrated a diagrammatic explanation of the action of the leaf spring device. Curve a indicates the operation of the ordinary coil spring or resisting element, showing how a deflection begins at any force exerted. Curve b indicates the ideal type of response desired, in which the spring has such a threshold value that no movement occurs until a certain force is reached, when no further force is needed to move the valve. Curve c indicates the operation of the present device wherein an initial or threshold value must be reached before the sliding valve is moved due to the opposition of the spring. After the initial value is reached very little force is required to further move the valve.

The operation of the device is as follows: When used under suction, as is common practice at the present time, device 6 sucks air through instrument 11 thereby revolving the rotating element thereof. Air is sucked by device 6 through pipe 7 thereby creating a vacuum on the inside of Sylphon or bellows 13. If this vacuum be the value desired, the pressure difference between said vacuum and the air pressure, entering hole 15, screen 15a duct 16 and impinging around the circumference of bellows 13 and upon disc 25, is less than the force required to initially move the slide valve. The suction is, therefore, maintained at a constant value.

Whenever the vacuum in said bellows and, hence, in the instrument or instruments, increases beyond the value desired, the pressure difference between said vacuum and the air pressure is equal to or greater than the force required to overcome the initial set or threshold value of springs 32 and 33, then element 26 is moved to the left, reducing the port area of port 36

27 and thereby the vacuum in bellows 13 is reduced to the initial desired value. The spring elements 32 and 33 with their initial set due to elements 34 and 35 and other means for providing a calibrated initial set, thus allow movement of element 26 upon a change in vacuum from the one desired and thereby give a substantially instantaneous action upon any change in the suction supplied to instrument 11. The capacity of the pump means 6 or the setting of valve 9 can be so chosen as to insure a value of vacuum just below the threshold value so that any change in vacuum is an increase and the threshold value is immediately reached with consequent actuation of the valve to thereby prevent any change in the speed of the rotor of the gyro instrument.

If desired, the pressure regulating device may be connected between the pump 6 and the instrument 11 so that any increase in vacuum actuates slide 26 to by-pass air from the atmosphere or any source into the Sylphon or bellows 13 thereby controlling the vacuum. When so used the only change required in the regulator valve itself is the replacement of slide valve part 26 by another slide valve part in which the apices of the ports are reversed so that air enters upon movement of the part 26 to the left.

When so used pipe 7 is connected to the stem of a T connection one side of which is connected to the pump and the other to the instrument. Pipe 7 is connected to an air filter whereby air enters said pipe 7 to break the increase of vacuum in the chamber of diaphragm 13 upon proper actuation of slide 26.

Although only one embodiment of the invention has been illustrated and described other changes and modifications in form, materials and relative arrangement of parts may be made without departing from the scope of the invention. For example, means other than elements 34 and 35 may be provided to give the initial set or threshold value to the spring devices, whereby a pre-calibrated spring structure is provided or the threshold value is set without transmitting said force to the diaphragm structure to thereby assume a balanced relation which would destroy the threshold value. Reference is, therefore, to be had to the appended claims for a definition of the limits of the invention.

What is claimed is:

1. In a pressure regulator system for aircraft instruments adapted to be placed between the pump and instruments, a casing, a bellows open to the atmosphere on one side thereof and subject to the pressure to be regulated on the other side thereof, valve means connected to said bellows to be actuated thereby, means exerting a resistive force against the movement of said bellows, said means comprising two oppositely convex leaf springs, means constraining said springs to their convexity whereby said springs exert a resistive force of a corresponding threshold value, said valve means being actuated by said bellows against the longitudinal compression of said leaf springs.

2. In a pressure regulator system for aircraft instruments adapted to be placed between the pump and the instruments, a bellows controlled by a pressure proportional to said pressure to be regulated, valve means actuated by said bellows, means exerting a force to control the movement of said valve means comprising, a leaf spring initially positioned in such a manner that when said valve is moved thereagainst a threshold value of resilient opposition in said spring must be overcome, said valve means being actuated by said bellows against the longitudinal compression of said leaf spring.

3. In a pressure regulator valve, ports in said valve, means for changing the relative positions of said ports, and means opposing said relative movement comprising two leaf springs, convex in configuration, and means constraining said springs at all times to said convex configuration, said changing means being actuated against the longitudinal compression of said springs.

4. In a pressure regulator, a casing, means disposed in one part of said casing for connecting a conduit to said casing for conveying the pressure to be regulated, bellows means within said casing exposed to the pressure to be regulated on one side thereof and to the atmosphere on the other side thereof, sliding valve means connected to said bellows for actuation thereby and provided with ports controlling said pressure, retarding means between said slide valve and said casing comprising leaf springs, spacing means between said springs, said sliding valve being actuated by said bellows against the longitudinal compression of said leaf springs, a passage leading from said ports to another part of said casing, and means in said last part for connecting a conduit to said casing.

5. In a pressure regulating system for aircraft instruments, a bellows exposed on one side to the pressure to be regulated and on the other side to a standard pressure, valve means connected to said bellows for actuation thereby, yielding means restraining the movement of said valve, said yielding means comprising a leaf spring having impressed thereon a threshold value of force that must be overcome before said bellows can actuate said valve against the longitudinal compression of said spring.

6. In a pressure regulator valve, ports in said valve, means responsive to the pressure to be regulated for changing the relative position of said ports to control the flow through said valve, a leaf spring opposing the change in relative position, and means impressing upon said spring a threshold force to be overcome by said pressure to be regulated before said ports can be relatively moved, said relative movement being opposed by the longitudinal compression of said spring.

7. In a pressure regulator, means responsive to the pressure to be regulated, valve means actuated by said responsive means, retarding means connected to said valve means, said retarding means comprising a leaf spring, means urging said leaf spring to a desired configuration whereby said spring is impressed with a threshold force to be overcome by the pressure to be regulated, said valve being actuated by said responsive means against the longitudinal compression of said spring.

8. In a pressure regulator, valve means controlling the flow therethrough, means actuating said valve means in one direction with a force proportional to the pressure to be regulated, and resilient retarding means having a threshold value of retarding force to oppose the movement of said valve, by the longitudinal compression of said resilient means.

9. In a pressure regulator, valve means controlling the flow therethrough, means actuating said valve means in one direction with a force proportional to the pressure to be regulated, and resilient retarding means having a threshold value of retarding force to oppose the movement of said valve said resilient means comprising a longitudinally stressed leaf spring.

10. A pressure regulator comprising a valve seat, a valve coacting with said seat, pressure responsive means for actuating said valve in one direction and resilient means for opposing said movement comprising a leaf spring initially impressed with a longitudinal stress whereby said spring exerts a threshold force that must be overcome by said pressure means before said valve actuation ensues.

DIMITRY E. OLSHEVSKY.